United States Patent
Buser

(10) Patent No.: US 9,003,376 B2
(45) Date of Patent: Apr. 7, 2015

(54) SOFTWARE BREAKPOINTS WITH TAILORING FOR MULTIPLE PROCESSOR SHARED MEMORY OR MULTIPLE THREAD SYSTEMS

(75) Inventor: Mark L. Buser, Green Brook, NJ (US)

(73) Assignee: Texas Instruments Incorporated, Dallas, TX (US)

( * ) Notice: Subject to any disclaimer, the term of this patent is extended or adjusted under 35 U.S.C. 154(b) by 1944 days.

(21) Appl. No.: 10/215,754

(22) Filed: Aug. 9, 2002

(65) Prior Publication Data

US 2004/0030870 A1    Feb. 12, 2004

(51) Int. Cl.
G06F 9/44 (2006.01)
G06F 9/30 (2006.01)
G06F 11/36 (2006.01)

(52) U.S. Cl.
CPC ........ *G06F 9/30181* (2013.01); *G06F 11/3648* (2013.01)

(58) Field of Classification Search
USPC ................ 717/124–130; 712/227; 714/30, 38
See application file for complete search history.

(56) References Cited

U.S. PATENT DOCUMENTS

| | | | | |
|---|---|---|---|---|
| 3,411,147 A | * | 11/1968 | Packard | 712/227 |
| 5,072,418 A | * | 12/1991 | Boutaud et al. | 708/207 |
| 5,329,471 A | * | 7/1994 | Swoboda et al. | 703/23 |
| 5,671,435 A | * | 9/1997 | Alpert | 712/38 |
| 5,694,589 A | * | 12/1997 | Glew et al. | 712/227 |
| 5,787,245 A | * | 7/1998 | You et al. | 714/38 |
| 5,796,974 A | * | 8/1998 | Goddard et al. | 712/211 |
| 5,815,653 A | * | 9/1998 | You et al. | 714/38 |
| 5,829,029 A | * | 10/1998 | Shelly et al. | 711/133 |
| 5,848,264 A | * | 12/1998 | Baird et al. | 395/500 |
| 5,970,241 A | * | 10/1999 | Deao et al. | 712/227 |
| 6,016,555 A | | 1/2000 | Deao et al. | |
| 6,055,649 A | * | 4/2000 | Deao et al. | 714/30 |
| 6,065,091 A | * | 5/2000 | Green | 711/3 |
| 6,065,106 A | * | 5/2000 | Deao et al. | 712/24 |
| 6,134,652 A | * | 10/2000 | Warren | 712/227 |
| 6,158,045 A | * | 12/2000 | You | 717/124 |

(Continued)

OTHER PUBLICATIONS

Caswell and Black "Implementing a Mach Debugger for Multithreaded Applications", Nov. 1989, USENIX Technical Conference and Exhibition.*

(Continued)

*Primary Examiner* — Jason Mitchell
(74) *Attorney, Agent, or Firm* — Robert D. Marshall, Jr.; Frank D. Cimino

(57) ABSTRACT

The present invention provides methods for executing instructions in a processor to facilitate the debugging of digital systems. In these methods, a halt identifier field is associated with every instruction that holds an encoding specifying an action to be performed by a processor. As instructions are executed on a processor, actions are performed by the processor based on the value of the halt identifier field of the executed instructions. In an embodiment, when each instruction is executed, the contents of the halt identifier field are compared to a pre-selected identifier value and the processor is halted if the values are the same. In a multiprocessor system, the pre-selected identifier may be a unique value that identifies the processor such that when the halt identifier field is equal to that value, the processor will halt. In a single processor system, the pre-selected value may be used to identify a task, a process, or a thread of execution that is to be halted when a halt identifier field with that value is encountered.

12 Claims, 5 Drawing Sheets

(56) References Cited

U.S. PATENT DOCUMENTS

| | | | |
|---|---|---|---|
| 6,480,818 B1* | 11/2002 | Alverson et al. | 703/26 |
| 6,718,484 B1* | 4/2004 | Kodera | 714/35 |
| 6,990,657 B2* | 1/2006 | Hunter et al. | 717/129 |
| 7,131,114 B2* | 10/2006 | Nguyen et al. | 717/129 |
| 2002/0019929 A1* | 2/2002 | Kurata | 712/226 |
| 2002/0100024 A1* | 7/2002 | Hunter et al. | 717/129 |
| 2003/0014736 A1* | 1/2003 | Nguyen et al. | 717/129 |
| 2003/0074650 A1* | 4/2003 | Akgul et al. | 717/129 |
| 2003/0154463 A1* | 8/2003 | Betker et al. | 717/129 |
| 2003/0200343 A1* | 10/2003 | Greenblat et al. | 709/251 |
| 2003/0212830 A1* | 11/2003 | Greenblat et al. | 709/251 |
| 2004/0030870 A1* | 2/2004 | Buser | 712/227 |
| 2005/0240820 A1* | 10/2005 | Vannerson et al. | 714/35 |

OTHER PUBLICATIONS

Johnson "Some Requirements for Architectural Support of Software Debugging" 1982, ACM pp. 140-148.*
Buhr, Karsten and Shih "KDB: A Multi-threaded Debugger for Multi-threaded Applications" 1996, ACM, pp. 80-87.*
Bruegge "Program Development for a Systolic Array.", 1988, ACM, pp. 31-41.*
Schulz and Mueller "A Thread Aware Debugger wtih an Open Interface" 2000, International Symposium on Software Testing and Analysis.*
Buhr and Denda "Profiling User-Level Threads in a Shared-Memory Progrmming Environment", 1998, ISCOPE'98, pp. 159-166.*
NN8907370, "Breakpoint Bit Technique for an Address Compare Function", IBM Technical Disclosure Bulletin, Jul. 1989.*

* cited by examiner

SOFTWARE BREAKPOINTS WITH TAILORING FOR MULTIPLE PROCESSOR SHARED MEMORY OR MULTIPLE THREAD SYSTEMS

FIELD OF THE INVENTION

This invention generally relates to digital systems, and more specifically to improvements in processor and digital system design to facilitate debugging of digital systems comprised of one or more processors.

BACKGROUND OF THE INVENTION

The advent of the system-on-a-chip (SOC) architectures for embedded systems has created many challenges for the software development systems used to develop and debug software applications that execute on these architectures. These systems may be comprised of multiple interconnected processors that share the use of on-chip and off-chip memory. A processor may include some combination of instruction cache (ICache) and data cache (DCache) to improve processing performance and can be instantiated from a design library as a single megacell. Furthermore, multiple megacells, with memory being shared among them, may be incorporated in a single embedded system. The processors may physically share the same memory without accessing data or executing code located in the same memory locations or they may use some portion of the shared memory as common shared memory.

Common shared memory contains executable code or data that will be accessed or executed by more than one processor, possibly simultaneously. While such memory sharing is advantageous in the final product, it creates potential debugging problems during application development. If a software breakpoint (SWBP) is set in common shared memory, all processors that access that shared memory location must honor the breakpoint. Also, if one processor halts at the breakpoint, any other processor that could potentially access that shared memory location should also be halted to ensure that no breakpoints are missed and invalid code is not executed.

SUMMARY OF THE INVENTION

Illustrative embodiments of the present invention seek to provide methods for executing instructions in a processor to facilitate the debugging of digital systems. One such method includes providing an instruction field in every instruction that holds an encoding specifying an action to be performed by the processor and executing instructions on the processor such that actions are performed by the processor based on the value of the halt identifier field of the executed instructions. In an embodiment, when each instruction is executed, the contents of the halt identifier field are compared to a pre-selected identifier value and the processor is halted if the values are the same. In a multiprocessor system, the pre-selected identifier may be a unique value that identifies the processor such that when the halt identifier field is equal to that value, the processor will halt. In a single processor system, the pre-selected value may be used to identify a task, a process, or a thread of execution that is to be halted when a halt identifier field with that value is encountered.

In other methods for executing instructions on a digital system comprised of one or more processors, a secondary memory is provided to hold halt identifiers associated with each word of primary memory or the secondary memory may be limited to holding halt identifiers only for shared locations in primary memory. As each instruction is executed, its associated halt identifier is read from the second memory and the processor performs an action based on the value of that halt identifier. In an embodiment of this method, the processor is halted if the halt identifier corresponds to a pre-selected identifier value. That pre-selected identifier value may be a value that uniquely identifies the processor or a task, process, or thread of execution on that processor.

Software development systems are also provided which implement the above methods. These systems are comprised of a host computer operable to execute a software development tool and a target hardware system comprised of one or more processors connected to the host computer through a test port where each processor is operable to execute one of the methods and the software development tool is operable to support debugging of application programs executing on the target hardware system.

BRIEF DESCRIPTION OF THE DRAWINGS

Particular embodiments in accordance with the invention will now be described, by way of example only, and with reference to the accompanying drawings in which like reference signs are used to denote like parts unless otherwise stated, and in which.

Corresponding numerals and symbols in the different figures and tables refer to corresponding parts unless otherwise indicated.

DETAILED DESCRIPTION OF EMBODIMENTS OF THE INVENTION

Thus, a need has been identified for methods of executing instructions on processors that permit the selective enabling of software breakpoints in common shared memory such that all processors sharing that memory are not required to honor a software breakpoint unless specifically requested to do so during the software debug process. As will be seen, such methods have the added advantage that they may be applied in a single processor system to selectively honor software breakpoints in tasks, processes, or threads of execution. Furthermore, there is a need for software development systems to support debugging of application programs executing on processors that incorporate such methods.

The methods described below are equally applicable to processors in which a software breakpoint is implemented with a special breakpoint opcode and to processors in which a software breakpoint capability is provided as a single bit or bit field in every instruction opcode. Processors of both types are well known to those skilled in the art. A processor of the latter type is described in detail in U.S. Pat. No. 6,016,555, "Non-Intrusive Software Breakpoints in a Processor Instruction Execution Pipeline" issued to Douglas Deao, et al.

Figure 1:
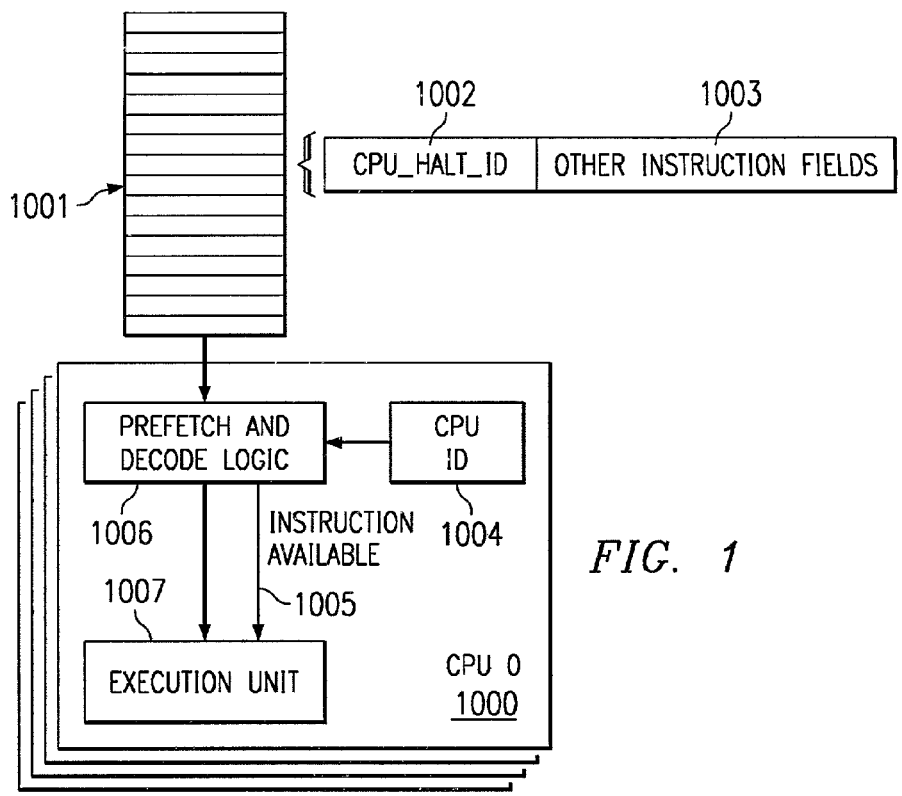
FIG. 1 illustrates a method for executing instructions in a processor such that an action will be performed based on the contents of a CPU halt identifier that is associated with each instruction.

FIG. 1 illustrates a method for executing instructions in a processor such that an action will be performed based on the contents of a CPU halt identifier that is associated with each instruction. Instruction memory 1001 is comprised of instructions from the instruction set of CPU 1000. Each instruction in instruction memory 1001 is comprised of a CPU halt identifier field 1002 in addition to other instruction fields 1003. CPU halt identifier field 1002 may be encoded in any convenient manner, e.g. 1-hot encoding where each bit in the field represents one processor in the system or binary encoding where each processor is assigned a unique binary value. The size of CPU halt identifier field 1002 may be selected to fit the most likely system configurations with 1, 2, 4, 8 and 16 bits being the most likely sizes. The size of the instruction operation code versus the number of CPUs in the system is the determinative factor in sizing this field.

Table 1 presents an example of one possible binary encoding of CPU halt identifier field 1002 for a system with 6 CPUs.

TABLE 1

| | HALT_ID | Meaning |
|---|---|---|
| 1 | 000 | Halt None |
| 2 | 001 | Halt CPU_A |
| 3 | 010 | Halt CPU_B |
| 4 | 011 | Halt CPU_C |
| 5 | 100 | Halt CPU_D |
| 6 | 101 | Halt CPU_E |
| 7 | 110 | Halt CPU_F |
| 8 | 111 | Halt All |

CPU halt identifier field 1002 can be encoded with HALT_NONE or HALT_ALL values in addition to unique identifiers for each processor. The HALT_NONE value, most likely all 0's, would be the default value to signify that no software breakpoint is set for a given instruction. The HALT_ALL value, most likely all 1's, would be used to cause all processors to halt on a given instruction.

As each instruction in instruction memory 1001 is read from memory by prefetch and decode logic 1006 of CPU 1000, the value of the CPU halt identifier field 1002 for that instruction is compared to the value of CPU identifier 1004. If these values are the same, a software breakpoint for the CPU is executed and no instruction enters execution unit 1007. If not, instruction available signal 1005 is asserted and the instruction enters execution unit 1007. Prefetch and decode logic 1006 may also be designed to handle the special cases of HALT_NONE and HALT_ALL encoding. For example, CPU identifier 1004 may be a special register within the CPU or a simple "strapping" done during the instantiation of the CPU in the system design.

Figure 2:
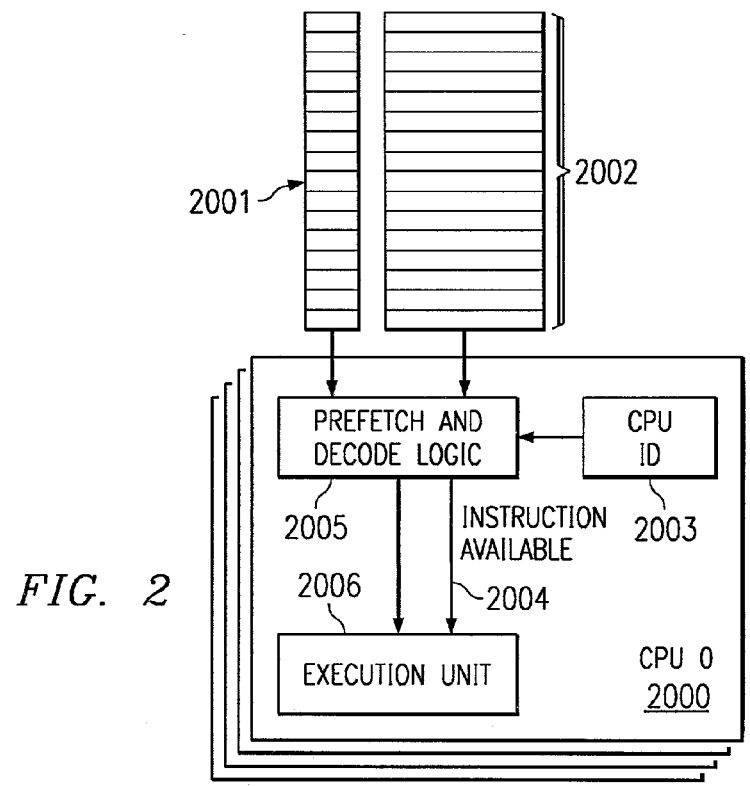
FIG. 2 presents a second method for executing instructions in a digital system comprising one or more processors such that an action will be performed based on the contents of a CPU halt identifier that is associated with each instruction.

FIG. 2 presents a second method for executing instructions in a digital system comprising one or more processors such that an action will be performed based on the contents of a CPU halt identifier that is associated with each instruction. In this embodiment, instruction memory 2002 contains instructions from the instruction set of CPU 2000 and secondary memory 2001 contains a CPU halt identifier field for each word in instruction memory 2002. Secondary memory 2001 may be written via the same path as instruction memory 2002. Alternatively, CPU 2000 may provide a special addressing mode. The CPU halt identifier fields may be encoded in the same manner as described in the discussion of FIG. 1 above.

As each instruction in instruction memory 2002 is read from memory by prefetch and decode logic 2005, the corresponding CPU halt identifier location in secondary memory 2001 is also read and presented to prefetch and decode logic 2005. The value fetched from the CPU halt identifier location is compared to the value of CPU identifier 2003. If these values are the same, a software breakpoint for that CPU is executed and no instruction enters execution unit 2006. If not, instruction available signal 2004 is asserted and the instruction enters execution unit 2006. Prefetch and decode logic 2005 may also be designed to handle the special cases of HALT_NONE and HALT_ALL encoding. For example, CPU identifier 2003 may be a special register within the CPU or a simple "strapping" done during the instantiation of the CPU in the system design.

The method of FIG. 2 may be further improved by providing a CPU halt identifier field in secondary memory 2001 for shared memory locations only. This improvement has the advantage of reducing the size of the required secondary memory in digital systems comprising multiple processors. The remainder of the method works as described above in the discussion of FIG. 2.

The methods described above have the advantage that they may be applied in a single processor system to selectively halt a task, a process, or a thread of execution at a software breakpoint. The following paragraphs describe the operation of these methods in such a scenario. The descriptions refer to tasks only for convenience but it should be noted that the methods are equally applicable and work in the same manner for processes and threads of execution.

Figure 3:
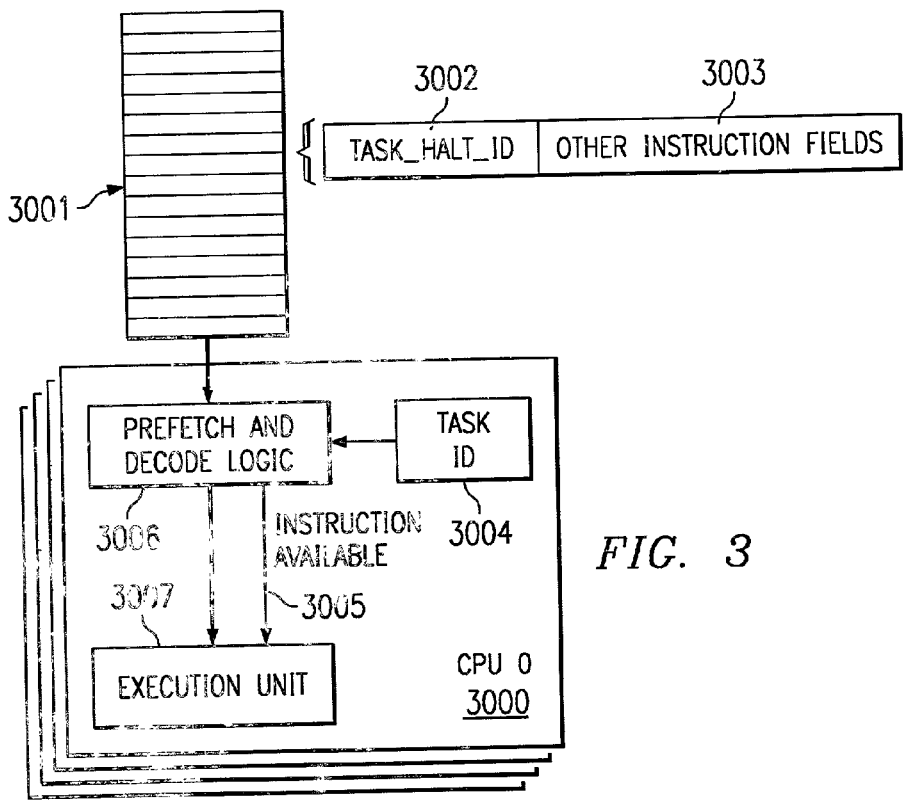
FIG. 3 illustrates a third method for executing instructions in a processor such that an action will be performed based on the contents of a task halt identifier that is associated with each instruction.

FIG. 3 illustrates a third method for executing instructions in a processor such that an action will be performed based on the contents of a task halt identifier that is associated with each task/instruction pairing. Instruction memory 3001 is comprised of instructions from the instruction set of CPU 3000. Each instruction in instruction memory 3001 is comprised of a task halt identifier field 3002 in addition to other instruction fields 3003. Task halt identifier field 3002 may be encoded in any convenient manner, e.g. 1-hot encoding where each bit in the field represents an operating system task within an application or binary encoding where each task is assigned a unique binary value. The size of task halt identifier field 3002 may be selected to fit the level of debugging support desired with 16 and 32 bits being the most likely sizes. The determinative factor in sizing this field will be the number of tasks that may be concurrently debugged by utilizing this field.

Table 2 presents an example of one possible binary encoding of an 8-bit task halt identifier field 3002 that will permit the use of the field for 254 concurrent tasks.

TABLE 2

| | HALT_ID | Meaning |
|---|---|---|
| 1 | 00000000 | Halt None |
| 2 | 00000001 | Halt Task_A |
| 3 | 00000010 | Halt Task_B |
| 4 | 00000011 | Halt Task_C |
| ... | ... | ... |
| 256 | 11111111 | Halt All |

Task halt identifier field 3002 can be encoded with HALT_NONE or HALT_ALL values in addition to unique identifiers for each task. The HALT_NONE value, most likely all 0's, would be the default value to signify that no software breakpoint is set for a given task's instruction. The HALT_ALL value, most likely all 1's, would be used to cause all tasks to halt on a given instruction.

As each instruction in instruction memory 3001 is read from memory by prefetch and decode logic 3006 of CPU 3000, the value of the task halt identifier field 3002 for that instruction is compared to the value of task identifier 3004. If these values are the same, a software breakpoint for the task associated with the value is performed and no instruction enters execution unit 3007. If not, instruction available signal 3005 is asserted and the instruction enters execution unit 3007. Prefetch and decode logic 3006 may also be designed to handle the special cases of HALT_NONE and HALT_ALL encoding. For example, task identifier 3004 may be a special register within CPU 3000 the value of which will be set by the debugger when a software breakpoint is set for a selected task.

Figure 4:
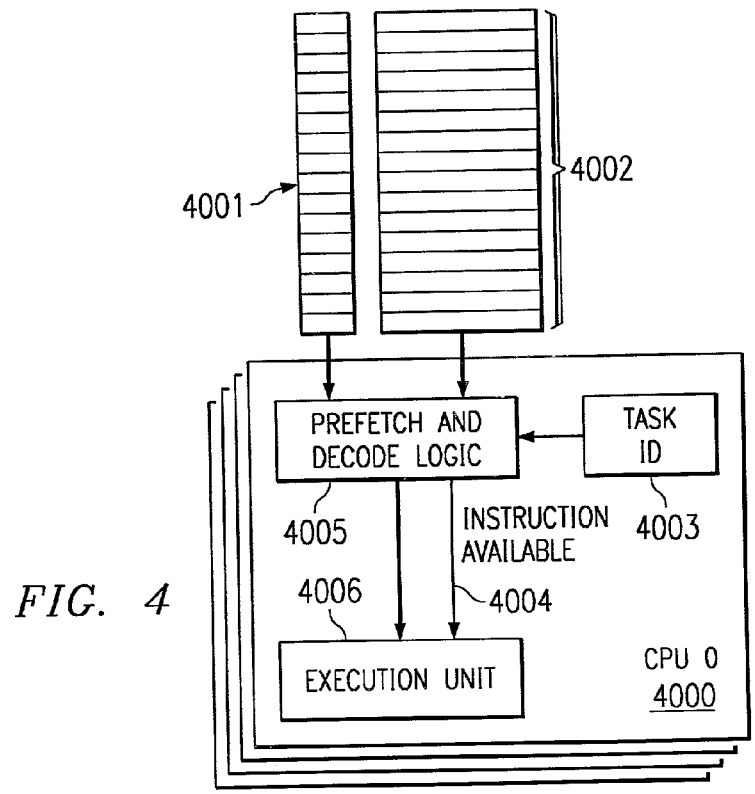
FIG. 4 presents a fourth method for executing instructions in a processor such that an action will be performed based on the contents of a task halt identifier that is associated with each instruction.

FIG. 4 presents a fourth method for executing instructions in a processor such that an action will be performed based on the contents of a task halt identifier that is associated with each task/instruction pairing. In this embodiment, instruction memory 4002 contains instructions from the instruction set of CPU 4000 and secondary memory 4001 contains a task halt identifier field for each word in instruction memory 4002. Secondary memory 4001 may be written via the same path as instruction memory 4002. Alternatively, CPU 4000 may provide a special addressing mode. The task halt identifier fields may be encoded in the same manner as described in the discussion of FIG. 3 above.

As each instruction in instruction memory 4002 is read from memory by prefetch and decode logic 4005, the corresponding task halt identifier location in secondary memory 4001 is also read and presented to prefetch and decode logic 4005. The value fetched from the task halt identifier location is compared to the value of task identifier 4003. If these values are the same, a software breakpoint for the task associated with the value is executed and no instruction enters execution unit 4006. If not, instruction available signal 4004 is asserted and the instruction enters execution unit 4006. Prefetch and decode logic 4005 may also be designed to handle the special cases of HALT_NONE and HALT_ALL encoding. For example, task identifier 4003 may be a special register within CPU 4000 the value of which will be set by the debugger when a software breakpoint is set for a selected task.

Figure 5:
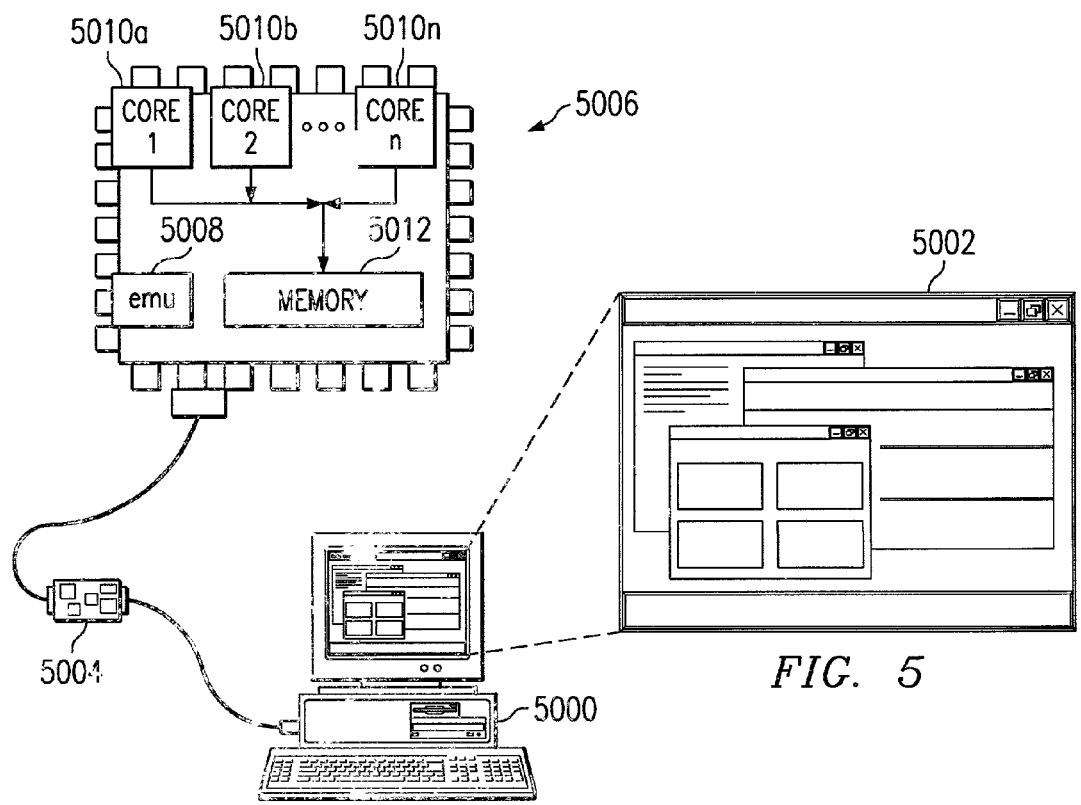
FIG. 5 illustrates the elements of a system for debugging embedded software applications executing on an embedded digital system comprised of multiple processors configured with shared memory where the processors contain circuitry for implementing one of the methods of FIGS. 1-4.

FIG. 5 illustrates the elements of a system for debugging embedded software applications executing on an embedded digital system comprised of multiple processors configured with shared memory. General-purpose personal computer 5000 is connected to target hardware 5006 with emulation controller 5004. Target hardware 5006 is a digital system that includes processors 5010a-5010n, memory 5012, and emulation logic 5008 to support software debugging activities.

Processors 5010a-5010n are connected to memory 5012, which holds the application program that is to be debugged. Processors 5010a-5010n each contain circuitry, e.g., scan chains connected to a test access port, to allow some level of emulation access to registers, local memory, etc. Processors 5010a-5010n also each contain circuitry to implement one or more of the methods of FIGS. 1-4. Memory 5012 may be any combination of on-chip and off-chip memory. Some portions of memory 5012 may be shared by processors 5010a-5010n. Emulation logic 5008 interacts with emulation controller 5004 during the debugging of the application program. Typically, emulation controller 5004 is connected to target hardware 5006 through a JTAG test access port. Details of the general construction of such digital systems are well known and may be found readily elsewhere. For example, U.S. Pat. No. 5,072,418 issued to Frederick Boutaud, et al, describes a digital signal processor (DSP) in detail. U.S. Pat. No. 5,329,471 issued to Gary Swoboda, et al, describes in detail how to test and emulate a DSP. General purpose computing system 5000 hosts a software development system that incorporates software debugging and emulation software with which the user interacts through user interface 5002.

The software development system hosted on computing system 5000 is operable to interface with emulation controller 5004 to perform debug operations on an application program executing on target hardware 5006. Specifically, the software development system is operable to manage software breakpoints such that the methods of FIGS. 1-4 are utilized as appropriate.

Figure 6A:
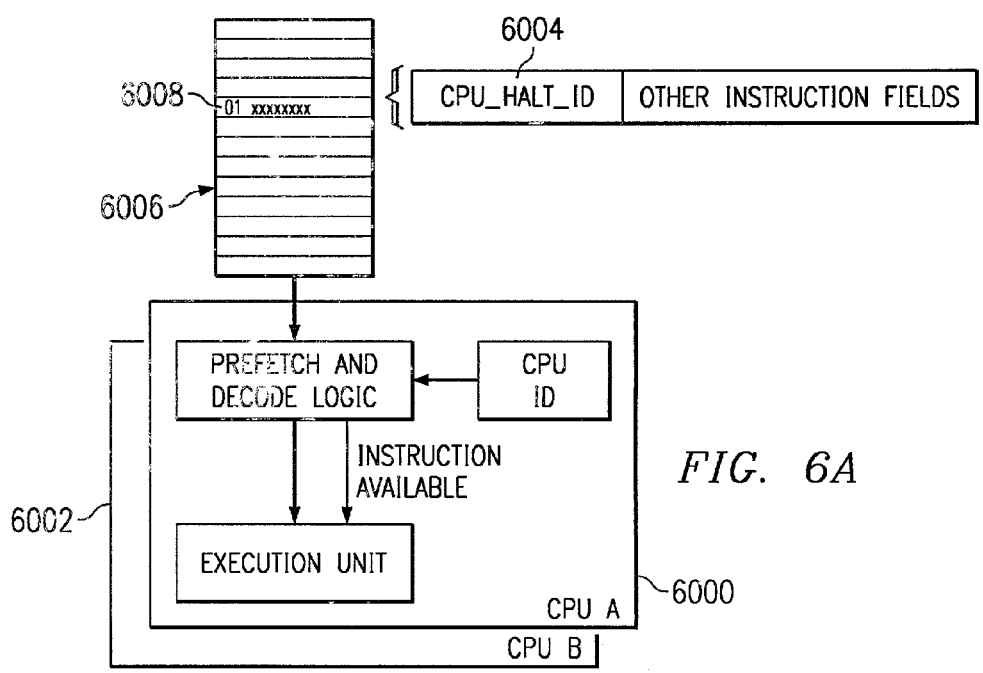
FIGS. 6A, 6B, and 6C present an example of stepping over a software breakpoint during the debugging of an application executing on the system of FIG. 5.
Figure 6B:
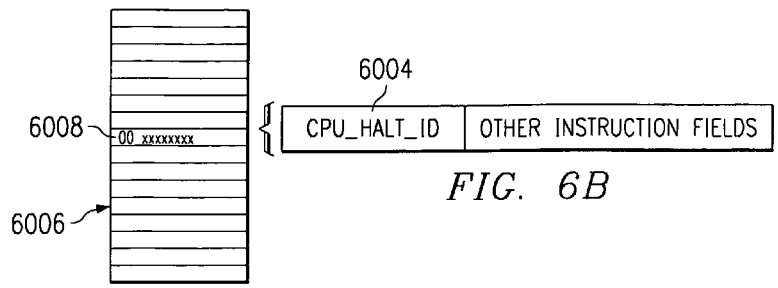
Figure 6C:
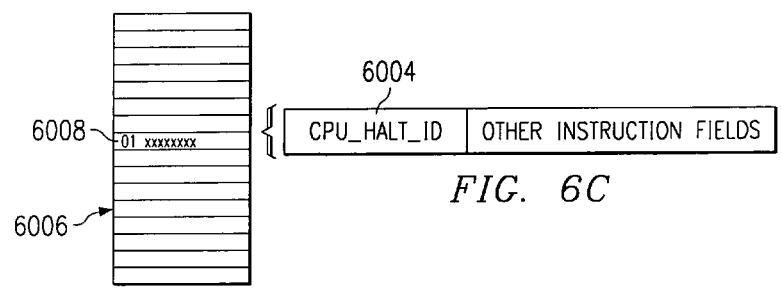

FIGS. 6A, 6B, and 6C present an example of stepping over a software breakpoint implemented with a special breakpoint instruction during the debugging of an application executing on the system of FIG. 5. For illustration purposes, target hardware 5006 is assumed to contain two processors that contain circuitry to implement the method of FIG. 1. These two processors are represented by CPU 6000 and CPU 6002 in FIG. 6A. CPU 6000 and CPU 6002 are connected to shared memory 6006 which represents a portion of memory 5012. Shared memory 6006 is common shared memory and contains instructions that may be executed by either CPU 6000 or CPU 6002. CPU halt identifier field 6004 is two bits in length and each instruction will contain this CPU halt identifier field. Table 3 presents the encoding of the possible values of CPU halt identifier field 6004.

TABLE 3

| | HALT_ID | Meaning |
|---|---------|---------|
| 1 | 00 | Halt None |
| 2 | 01 | Halt CPU_B |
| 3 | 10 | Halt CPU_A |
| 4 | 11 | Halt All |

In FIG. 6A, CPU 6002 has been halted at instruction 6008 because the value of CPU halt identifier field 6004 for that instruction is 01 indicating that CPU 6002 is to be halted if the instruction is executed. CPU 6000 will not be halted if it encounters instruction 6008 during execution.

When the user of the software development system of FIG. 5 wishes to resume execution of the application on CPU 6002, the software development system will interact with emulation controller 5004 to cause CPU 6002 to "step over" instruction 6008 without impacting the execution of CPU 6000. As illustrated in FIG. 6B, a value of 00 is written to CPU halt identifier field 6004 of instruction 6008. This value indicates that no processor should be halted if it fetches instruction 6008. The execution of CPU 6002 is resumed to execute only instruction 6008. Then, the original value of CPU halt identifier field 6004 of instruction 6008, 01, is written back into the field to restore the software breakpoint for CPU 6002 as shown in FIG. 6C. At no time during this process was the execution of CPU 6000 affected.

The stepping over of software breakpoints where target hardware 5006 contains processors with circuitry to implement the methods of FIGS. 2-4 is analogous to the above description and the operation of the software development system should be obvious to one skilled in the art.

Figure 7B:
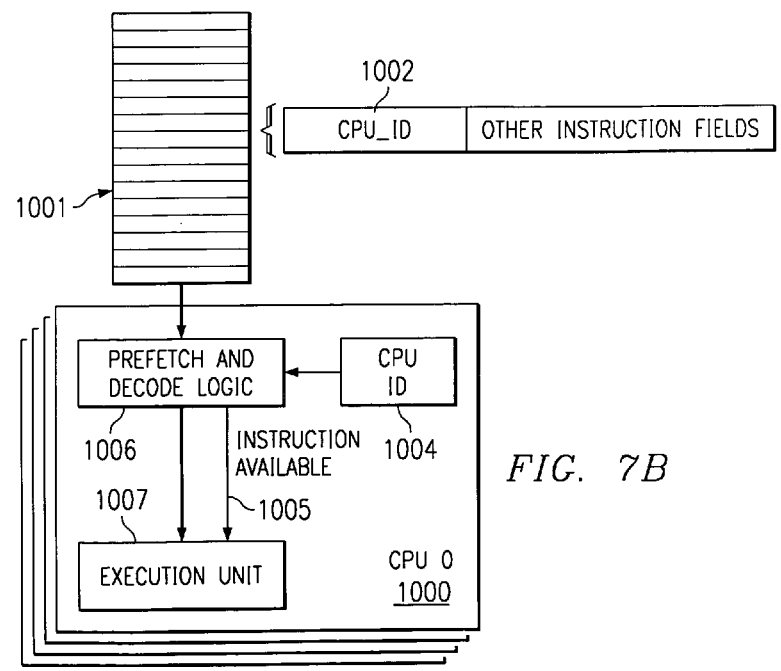
FIGS. 7A and 7B present alternate uses for the CPU halt identifier of FIG. 1.
Figure 7A:
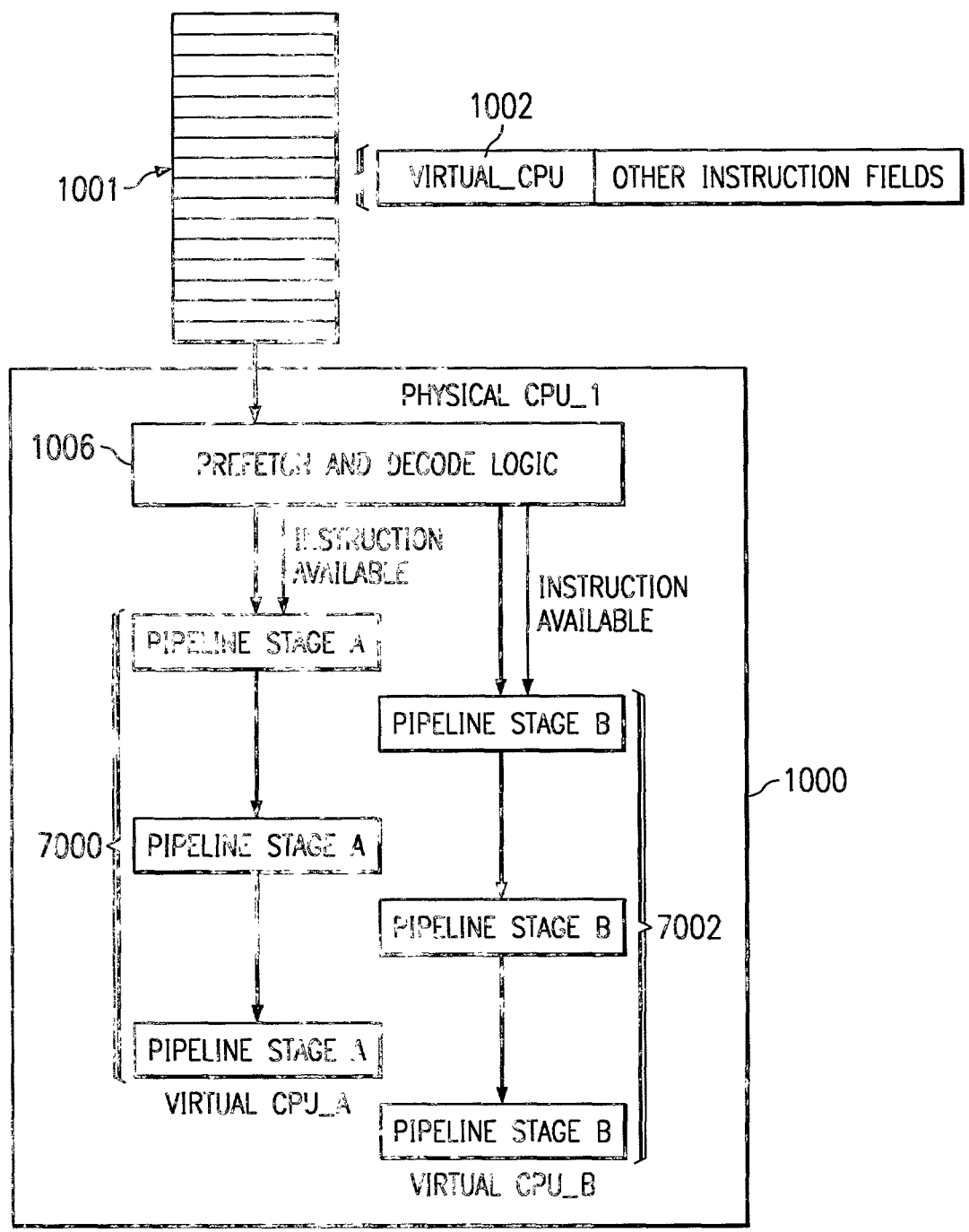

FIGS. 7A and 7B present alternate uses for the CPU halt identifier of FIG. 1. In these embodiments, prefetch and decode logic 1006 or other circuitry in CPU 1000 contains a mode indicator that is used to determine whether the action to be taken based on the value of CPU halt identifier field 1002 is to halt the indicated processor or if some other action may be taken.

In FIG. 7A, CPU halt identifier field 1002 is treated as a virtual CPU identifier which may be used to select which instruction set, pipeline configuration, or other customizable aspect of pipeline operation is to be used for the associated instruction. For example, when an instruction is fetched from instruction memory 1001, prefetch and decode logic 1006 will check the value of CPU halt identifier field 1002 of the fetched instruction to determine which pipeline configuration, configuration 7000 or configuration 7002, to send the instruction to for execution. This capability allows a compiler to configure the available CPU resources at compile time for various optimization or priority strategies or for different instruction sets.

In FIG. 7B, CPU halt identifier field 1002 may be either a CPU identifier or a thread identifier. But, rather than halting the identified CPU or thread as previously described, instead the identifier value is used to decide whether or not the instruction is to be executed on the CPU that has fetched the instruction or the thread that is currently executing. If there is a match, the instruction is executed: otherwise, it was meant for a different CPU or thread and is not executed. Instead, the next instruction is fetched. This capability allows the compiler to schedule execution on a selected thread or CPU at compile time.

While the invention has been described with reference to illustrative embodiments, this description should not be construed in a limiting sense. Various other embodiments of the invention will be apparent to persons skilled in the art upon reference to this description. For example, it is feasible to combine the methods for executing a software breakpoint on a selected CPU and executing a software breakpoint in a selected task, process, or thread of execution to create a method that would permit the execution of a software breakpoint on a selected CPU and in a selected task, process, or thread of execution on that CPU. The halt identifier field may be extended to permit an encoding that encompasses both identifying a CPU and a task, process, or thread of execution and both CPU identifier 1004 of FIG. 1 and task identifier 3004 may be implemented on each processor. In another embodiment, the CPU_ID register or Task_ID register and comparison circuitry may be implemented external to the processor core. If a match occurs with the CPU_Halt_ID or Task_Halt_ID field, then an interrupt signal is asserted by the comparison circuitry to initiate a breakpoint operation. It is therefore contemplated that the appended claims will cover any such modifications of the embodiments as fall within the true scope and spirit of the invention.

What is claimed is:

1. A software development system, comprising:
a memory storage system holding a software development tool program;
a host computer connected to the memory storage system, the host computer operable to execute the software development tool program;
a test port for connecting to a hardware system, the hardware system including
a plurality of data processors,
a shared instruction memory storing a plurality of instructions executable by the plurality of data processors, each and every instruction including a first instruction field exclusively specifying one of a plurality of halt identifiers and at least one other instruction field specifying a data processing operation, said at least one other instruction field being distinct from said first instruction field;
each data processor of the plurality of data processors including
a central processing unit identity register storing a value unique among said plurality of data processors,
an execution unit operable to perform a corresponding data processing operation in response to said at least one other instruction field of an instruction, and
an instruction fetch and decode logic connected to said shared instruction memory, said central processing unit identity register and said execution unit, said instruction fetch and decode logic operable to
fetch an instruction from said shared instruction memory,
compare the value of said one halt identifier specified by said first instruction field of said fetched instruction to said value stored in said central processing unit identity register,
halt said data processor if said values match, and
supply said at least one other instruction field of said fetched instruction to said corresponding execution unit if the values do not match; and
wherein the software development tool program is operable to support debugging of the application program executing on the hardware system.

2. A software development system, comprising:
a memory storage system holding a software development tool program;
a host computer connected to the memory storage system, the host computer operable to execute the software development tool program;
a test port for connecting to a hardware system, the hardware system including
a plurality of data processors,
a shared instruction memory storing a plurality of instructions executable by the plurality of data processors, each and every instruction including a first instruction field exclusively specifying one of a plurality of halt identifiers and at least one other instruction field specifying a data processing operation, said at least one other instruction field being distinct from said first instruction field;
each data processor of the plurality of data processors including
a task identity register storing a value unique among a plurality of tasks executable on said plurality data processors,
an execution unit operable to perform a corresponding data processing operation in response to said at least one other instruction field of an instruction, and
an instruction fetch and decode logic connected to said shared instruction memory, said task register and said execution unit, said instruction fetch and decode logic operable to
fetch an instruction from said shared instruction memory,
compare the value of said one halt identifier specified by said first instruction field of said fetched instruction to said value stored in said task identity register,
halt said data processor if said values match, and
supply said at least one other instruction field of said fetched instruction to said execution unit if the values do not match; and
wherein the software development tool program is operable to support debugging of the application program executing on the hardware system.

3. A multiprocessor system comprising:
a plurality of data processors;
a shared instruction memory storing a plurality of instructions executable by the plurality of data processors, each and every instruction including a first instruction field exclusively specifying one of a plurality of halt identifiers and at least one other instruction field specifying a data processing operation, said at least one other instruction field being distinct from said first instruction field;
each data processor of the plurality of data processors including
a central processing unit identity register storing a value unique among said plurality of data processors,
an execution unit operable to perform a corresponding data processing operation in response to said at least one other instruction field of an instruction, and
an instruction fetch and decode logic connected to said shared instruction memory, said central processing unit identity register and said execution unit, said instruction fetch and decode logic operable to
fetch an instruction from said shared instruction memory,
compare the value of said one halt identifier specified by said first instruction field of said fetched instruction to said value stored in said central processing unit identity register,
halt said data processor if said values match, and
supply said at least one other instruction field of said fetched instruction to said corresponding execution unit if the values do not match.

4. The multiprocessor system of claim 3, wherein:
said halt identifier further includes a halt all identifier; and
said instruction fetch and decode logic of each data processor is further operable to
compare said value of said one halt identifier specified by said first instruction field of said fetched instruction to said halt all identifier, and
halt said data processor if said one halt identifier matches said halt all identifier.

5. The multiprocessor system of claim 3, wherein:
said halt identifier further includes a halt none identifier; and
said instruction fetch and decode logic of each data processor is further operable to
compare said value of said one halt identifier specified by said first instruction field of said fetched instruction to said halt none identifier, and
not halt said data processor if said one halt identifier matches said halt none identifier.

6. The multiprocessor system of claim 3, wherein:
said central processing unit identity register of each of said plurality of data processors store values fixed upon manufacture.

7. The multiprocessor system of claim 3, wherein:
said instruction fetch and decode logic of each data processor is further operable to supply an instruction available signal to said corresponding execution unit if said values do not match; and
said execution unit of each data processor is further operable to perform a corresponding data processing operation in response to receipt of both said at least one other instruction field of said fetched instruction and said instruction available signal.

8. A multiprocessor system comprising:
a plurality of data processors;
a shared instruction memory storing a plurality of instructions executable by the plurality of data processors, each and every instruction including a first instruction field exclusively specifying one of a plurality of halt identifiers and at least one other instruction field specifying a data processing operation, said at least one other instruction field being distinct from said first instruction field;
each data processor of the plurality of data processors including
a task identity register storing a value unique among a plurality of tasks executable on said plurality data processors,
an execution unit operable to perform a corresponding data processing operation in response to said at least one other instruction field of an instruction, and
an instruction fetch and decode logic connected to said shared instruction memory, said task register and said execution unit, said instruction fetch and decode logic operable to
fetch an instruction from said shared instruction memory,
compare the value of said one halt identifier specified by said first instruction field of said fetched instruction to said value stored in said task identity register,
halt said data processor if said values match, and
supply said at least one other instruction field of said fetched instruction to said execution unit if the values do not match.

9. The multiprocessor system of claim 8, wherein:
said halt identifier further includes a halt all identifier; and
said instruction fetch and decode logic of each data processor is further operable to
compare said value of said one halt identifier specified by said first instruction field of said fetched instruction to said halt all identifier, and
halt said data processor if said one halt identifier matches said halt all identifier.

10. The multiprocessor system of claim 8, wherein:
said halt identifier further includes a halt none identifier; and
said instruction fetch and decode logic of each data processor is further operable to
compare said value of said one halt identifier specified by said first instruction field of said fetched instruction to said halt none identifier, and
not halt said data processor if said one halt identifier matches said halt none identifier.

11. The multiprocessor system of claim 8, wherein:
said task identity register of each of said plurality of data processors is set by a debugger when a software breakpoint is set for a selected task.

12. The multiprocessor system of claim 8, wherein:
said instruction fetch and decode logic of each data processor is further operable to supply an instruction available signal to said corresponding execution unit if said values do not match; and
said execution unit of each data processor is further operable to perform a corresponding data processing operation in response to receipt of both said at least one other instruction field of said fetched instruction and said instruction available signal.

* * * * *